(No Model.)
J. F. WYNKOOP.
TABLE KNIFE FOR GREEN CORN.
No. 399,109. Patented Mar. 5, 1889.
Fig. 1.
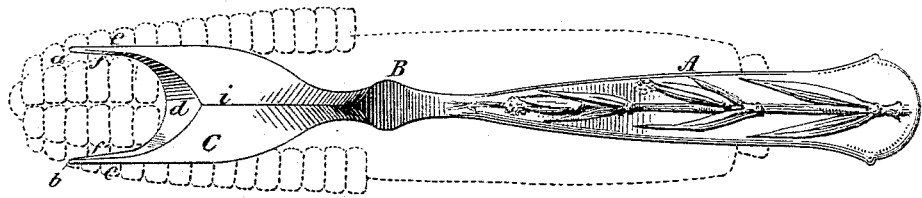
Fig. 2.
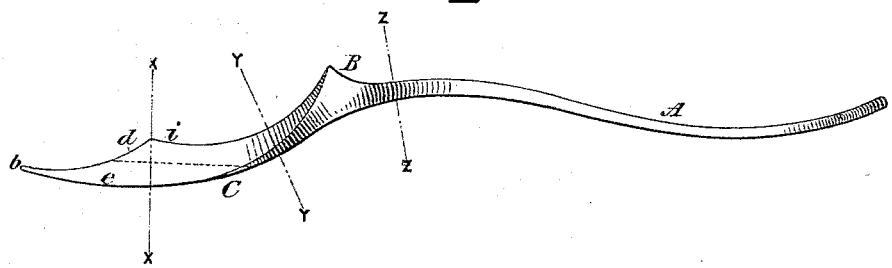
Fig. 4.     Fig. 5.
     
Fig. 3.     Fig. 6.
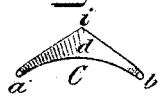     
Fig. 7.
WITNESSES:     INVENTOR,
Gustav Dieterich     Jehiel F. Wynkoop,
    BY
    Chas. O. Gill
    ATTORNEY.

UNITED STATES PATENT OFFICE.

JEHIEL F. WYNKOOP, OF BROOKLYN, NEW YORK, ASSIGNOR OF ONE-HALF TO ALONZO I. WILCOX, OF BRADFORD, PENNSYLVANIA.

TABLE-KNIFE FOR GREEN CORN.

SPECIFICATION forming part of Letters Patent No. 399,109, dated March 5, 1889.

Application filed July 3, 1888. Serial No. 278,972. (No model.)

*To all whom it may concern:*

Be it known that I, JEHIEL F. WYNKOOP, a citizen of the United States, and a resident of Brooklyn, in the county of Kings and State of New York, have invented certain new and useful Improvements in Table-Knives for Green Corn, of which the following is a specification.

The invention relates to improvements in table-knives for green corn; and it consists in an implement of novel construction, as hereinafter fully described, whereby the corn may be quickly and without inconvenience removed from the cob without danger of the latter slipping and with but slight effort on the part of the person using the knife.

The construction of my improved knife is such that the rows of corn may be removed by a longitudinal movement of the implement, one, two, or more rows being removed during each movement of the knife along the length of the cob.

The knife which is the subject of this application is adapted for use at the table and may be used as conveniently as any other article of table-ware.

Referring to the accompanying drawings, Figure 1 is a top plan view of a knife embodying the elements of my invention, illustrated in connection with the representation of an ear of corn; Fig. 2, an edge view of same; Fig. 3, a front view of the blade of the knife; Fig. 4, a transverse section on the dotted line X X of Fig. 2; Fig. 5, a like section on the dotted line Y Y of Fig. 2; Fig. 6, a like section on the dotted line Z Z of Fig. 2, and Fig. 7 a top plan view of a modified form of the knife.

In the drawings, A designates the handle of the knife, B the finger-rest, and C the body or blade. The handle A will be of any suitable configuration adapting it for use at the table, and will preferably be ornamental, in order to render the implement attractive and suitable for the purpose for which it is intended. The handle A, adjacent to the body C, is provided with a finger-rest, B, formed in the metal of which the implement is constructed, the purpose of the rest being to facilitate the cutting of the corn from the cob and to render the implement convenient and easy to handle. The body C is concave on its under surface, as indicated by dotted lines in Fig. 2 and full lines in Figs. 3 and 4, for the purpose of enabling it to closely fit around the cob during the operation of removing the corn therefrom. The front extremity of the body C is fashioned into tines $a$ $b$ and the cutting-edge $d$, the latter being along the front edge of the body C between the said tines, which also will be sharpened on their edges, (lettered $e$ $f$, respectively,) the cutting-edge $f$ meeting and forming a continuation of the cutting-edge $d$, above referred to. The upper surface of the body C, between the cutting-edge $d$ and the finger-rest B, is beveled on opposite sides, leaving a ridge, $i$, which will have the effect of causing the corn as it is cut from the cob to fall downward on each side of the body C instead of possibly riding up the same and soiling the hand. The extreme points of the tines $a$ $b$ will be slightly rounded, as illustrated in Fig. 3, for the purpose of avoiding any liability of said points entering the cob and rendering thereby the use of the implement troublesome or inconvenient.

The modified form of the knife illustrated in Fig. 7 is different from the knife illustrated in Fig. 1 in that it is provided with an additional tine, $m$, sharpened on opposite edges and adapting the implement to remove a greater number of rows of corn than would be possible or convenient by the use of the knife illustrated in Fig. 1.

The width of the body C will control the number of rows of corn that may be removed by one longitudinal operation of the knife, and it is intended that the points of the tines will pass between the rows of corn.

What I claim as my invention, and desire to secure by Letters Patent is—

1. The table-knife for green corn, consisting of the handle A and the body C, the body being concave on its under side and having at its end the forwardly-extending tines $a$ $b$ and the continuous cutting-edges $d$ $f$, substantially as shown and described.

2. The table-knife for green corn, consisting of the handle A and body C, the latter having the concave under surface and oppositely-beveled upper surface, and having also at its end the forwardly-extending tines $a\,b$ and cutting-edges $d\,e\,f$, substantially as shown and described.

Signed at New York, in the county of New York and State of New York, this 30th day of June, A. D. 1888.

JEHIEL F. WYNKOOP.

Witnesses:
 CHAS. C. GILL,
 W. A. C. MATTHIE.